United States Patent [19]
Yoshikawa et al.

[11] Patent Number: 5,598,292
[45] Date of Patent: Jan. 28, 1997

[54] METHOD OF DESIGNING A POST-OBJECTIVE TYPE OPTICAL SCANNER AND PRODUCT MADE BY THE METHOD

[75] Inventors: Motonobu Yoshikawa; Yoshiharu Yamamoto, both of Osaka; Hironori Nakashima, Takarazuka, all of Japan

[73] Assignee: Matsushita Electric Industrial Co., Ltd., Osaka, Japan

[21] Appl. No.: 22,651

[22] Filed: Mar. 1, 1993

[30] Foreign Application Priority Data

Mar. 2, 1992 [JP] Japan .................................. 4-044755

[51] Int. Cl.$^6$ .................................................. G02B 26/08
[52] U.S. Cl. ........................ 359/216; 359/206; 359/207
[58] Field of Search ................................... 359/662, 708, 359/711, 718, 205–207, 216–219

[56] References Cited

U.S. PATENT DOCUMENTS

| | | | |
|---|---|---|---|
| 4,758,059 | 7/1988 | Sakuma | 359/205 |
| 5,064,262 | 11/1991 | Matsumoto et al. | 359/205 |
| 5,089,907 | 2/1992 | Yoshikawa et al. | 359/206 |
| 5,179,465 | 1/1993 | Kondo | 359/206 |
| 5,255,113 | 10/1993 | Yoshikawa et al. | 359/216 |

FOREIGN PATENT DOCUMENTS

| | | |
|---|---|---|
| 0286368 | 4/1988 | European Pat. Off. . |
| 61-156020 | 7/1986 | Japan . |
| 63-063016 | 3/1988 | Japan . |
| 1169422 | 7/1989 | Japan . |
| 3211520 | 9/1991 | Japan . |

*Primary Examiner*—James Phan
*Attorney, Agent, or Firm*—Price, Gess & Ubell

[57] ABSTRACT

The present invention provides a method of designing a post-objective type optical scanner having an optical deflector composed of cylindrical or spherical reflecting surfaces for deflecting a converged light beam from a condensing lens by reflecting the converged light beam as it rotates, and a compensating lens located in an optical path between the optical deflector and a scanning surface for converging the deflected light beam from the optical deflector to a point on the scanning surface, of which power in the sub-scanning direction varies with a length from the center thereof in the scanning direction. The method is characterized in that a scanning speed(S) defined by a scanning width on a scanning surface per an angle unit of rotation of the optical deflector is selected by exploiting a characteristic that a maximum curvature of field in the scanning direction drops to a minimum value in a certain range predetermined by a length from a point of deflection of the optical deflector to the scanning surface(L) based on a correlation between the scanning speed and the maximum curvature of field in the scanning direction. In the method, offset of the f·θ characteristic is maintained to be within ±0.5%, and the certain range is expressed as $$\frac{L}{60} < S < \frac{L}{32}.$$

8 Claims, 9 Drawing Sheets

METHOD OF DESIGNING A POST-OBJECTIVE TYPE OPTICAL SCANNER AND PRODUCT MADE BY THE METHOD

BACKGROUND OF THE INVENTION (1) Field of the Invention

The present invention relates to a method of designing an optical scanner used in an image forming apparatus such as a laser printer, and more particularly, to a method of designing a post-objective type optical scanner wherein a converged light beam from a condensing lens is directed to an optical deflector which effects scanning thereof, and to a product made by the method.

(2) Description of the Related Art

An optical scanner widely used in conventional laser printers is a pre-objective type in which a condensing lens is placed in an optical path between a polygonal mirror and a photosensitive drum. The polygonal mirror is one of the optical deflectors which deflect a beam of light directed thereto and effect scanning thereof on the photosensitive drum as they rotate around the axis of rotation. The condensing lens is a lens through which the incident light beam is converged to a point on a scanning surface (the surface of the photosensitive drum) in a scanning direction, and in general, it is composed of a series of lenses. Unlike the other general purpose lenses, the condensing lens used in the optical scanner must hold a specific characteristic.

It must hold a characteristic known as the f·θ characteristic: an angle of scanning is proportional to a scanning width. In addition, it must be capable of compensating for curvature of field both in the scanning and sub-scanning directions as well as the f·θ characteristic. The curvature of field is a shift of a point of convergence from on a plane to on a curved plane, which results in a curved image. In FIG. 1, the curvature of field in the scanning direction or in the sub-scanning direction with the conventional pre-objective type optical scanner is illustrated.

As is previously explained, the condensing lens composed of a series of lenses is placed in an optical path in such a way that the deflected light beam is incident thereon. Hence, it is relatively easy to design the condensing lens capable of compensating for the curvature of field in both directions and f·θ characteristic. On the other hand, however, such compensation can not help enlarging the condensing lens, and thus aligning the condensing lens with a series of lenses becomes intricate, which leads to the increase of manufacturing costs. Moreover, such compensation requires a relatively long optical path, making it almost impossible to assemble a smaller optical scanner.

Given these circumstances, actively researched and commercialized in recent years as a compact and inexpensive optical scanner is a post-objective type in which the condensing lens is placed in an optical path prior to the optical deflector. In the optical scanner of this type, as is in the pre-objective type, a capability of compensating for the curvature of field in the both directions as well as the f·θ characteristic is essential.

Japanese Laid-Open Patent Application No. 1-169422 discloses one of the conventional post-objective type optical scanners, of which schematic view is in FIG. 2.

Numeral 22 is a condensing lens, and a beam of incident light from a semiconductor laser 21 is converged to a point on the scanning surface of a photosensitive drum 26 in the scanning direction. Numeral 23 is a cylindrical lens with a power in the sub-scanning direction, so that the incident light beam from the condensing lens 22 is converged to a point in the vicinity of a reflecting surface of a polygonal mirror 24 in the same direction. The polygonal mirror 24 is composed of cylindrical surfaces, and it effects scanning of the light beam from the cylindrical lens 23 directed thereto on the photosensitive drum 26 by deflecting the light beam as it rotates around an axis of rotation 27. Numeral 25 is a compensating lens with a power in the sub-scanning direction, so that the incident light beam from the polygonal mirror 24 is converged to a point on the scanning surface of the photosensitive drum 26 in the same direction. The photosensitive drum 26 is a photosensitive body exposed when subjected to radiation of the light beam, and numeral 27 is the axis of rotation of the polygonal mirror 24.

The operation of the conventional post-objective type optical scanner constructed as above is explained with referring to FIGS. 3(a) and (b), wherein optical paths in planes in the scanning and sub-scanning directions are illustrated, respectively.

A beam of light from the semiconductor laser 21 incident on the condensing lens 22 is converged to a point on the photosensitive drum 26 in the scanning direction, which is subsequently directed to the cylindrical lens 23 and converged to a point in the vicinity of the reflecting surface of the polygonal mirror 24 in the sub-scanning direction. The incident light beam from the cylindrical lens 23 is directed to the polygonal mirror 24 which effects scanning thereof on the photosensitive drum 26 by deflecting the light beam as it rotates around the axis of rotation 27; the reflecting surfaces thereof are cylindrical, so that the compensation for the curvature of field in the scanning direction is completed upon the deflection. The incident light beam on the compensating lens 25 from the polygonal mirror 24 is converged to a point on the photosensitive drum 26 again in the sub-scanning direction.

In summary, the compensation for the curvature of field in the scanning direction is made possible by designing the surface of the polygonal mirror 24 to be a cylindrical or spherical surface instead of straight surface, while that for the curvature of field in the sub-scanning direction and f·θ characteristic is made possible by placing the compensating lens 25 in an optical path between the polygonal mirror and scanning surface.

In addition, the compensating lens 25 is used to compensate for a tilt of the reflecting surface of the polygonal mirror 24 by designing a point of deflection to be geometrically conjugate with the scanning surface. The compensation for the curvature of field in the sub-scanning direction and f·θ characteristic is almost perfect with the compensating lens 25. However, the compensation for the curvature field in the scanning direction is inadequate with the polygonal mirror 24. As a matter of fact, the curvature of field in the scanning direction is acknowledged up to 2.7 mm. It may be possible to provide a new component to improve the compensation for the curvature of field in that direction, but accompanying with this, adverse effects are likely to be brought about on the almost perfect compensation of the curvature in the sub-scanning direction and f·θ characteristic. Therefore, a method of designing a post-objective type optical scanner capable of compensating the curvature of field in the scanning direction without adding any new component has been sought after.

SUMMARY OF THE INVENTION

The present invention has an object to propose a method of designing a small and inexpensive post-objective type optical scanner capable of obtaining high resolution by improving compensation for the curvature of field in the scanning direction without adding any new component.

The above object is fulfilled by a method of designing a post-objective type optical scanner in which a beam of light incident on a condensing lens is converged and subsequently deflected to effect scanning thereof on a scanning surface. The post-objective type optical scanner has an optical deflector composed of a plurality of cylindrical or spherical reflecting surfaces for deflecting the converged light beam from the condensing lens by reflecting the converged light beam as it rotates, and a compensating lens located in an optical path between the optical deflector and the scanning surface for converging the deflected light beam from the optical deflector to a point on the scanning surface, of which power in the sub-scanning direction varies with a length from the center thereof in the scanning direction. The method is characterized in that a scanning speed defined by a scanning width on the scanning surface per an angle unit of rotation of the optical deflector is selected by exploiting a characteristic that a maximum curvature of field in the scanning direction drops to a minimum value in a certain range predetermined by a length from a point of deflection of the optical deflector to the scanning surface based on a correlation between the scanning speed and the maximum curvature of field in the scanning direction.

In the method, the certain range may be larger than 1/60 of the length from the point of deflection of the optical deflector to the scanning surface, and smaller than 1/32 thereof.

In the method, the selected scanning speed may be in the certain range.

In the method, offset of the f·θ characteristic may be maintained to be within a range from −0.5% to 0.5%, and the certain range may be expressed as $$\frac{L}{60} < S < \frac{L}{32}$$

wherein S is the scanning speed, and L is the length from the deflecting point of the optical deflector to the scanning surface and 60 and 32 are units of angular measurements in radians.

In the method, a surface of incidence of the compensating lens may be a toric surface, and a surface thereof from which the light beam goes out may be an aspherical surface expressed by an equation having terms of quartric or more order.

In the method, the equation having terms of quartric or more order may be expressed as $$Z = \frac{\frac{Y^2}{R2}}{1 + \sqrt{1 - (1+K)\left(\frac{Y}{R2}\right)^2}} + AY^4 + BY^6 + CY^8 + DY^{10}$$

wherein R2, K, A, B, C, and D are constant numbers, an origin of the coordination is a vertex in the center of the surface of the compensating lens from which the light beam goes out, Z is an axis residing on an optical axis from the original to the point of deflection, and Y is an axis passing through the origin and is parallel to the scanning direction.

The present invention has another object to provide a post-objective type optical scanner made by the aforementioned method.

The above object is fulfilled by a post-objective type optical scanner made by the above method.

The above method exploits the characteristic that when the scanning speed is selected to be in the range predetermined by the length from the point of deflection of the optical deflector to the scanning surface, the curvature of field in the scanning direction drops to the minimum value.

As a consequent, the method facilitates designing a post-objective type optical scanner capable of compensating for the curvature of field in the scanning direction in addition to the f·θ characteristic and curvature of field in the sub-scanning direction.

BRIEF DESCRIPTION OF THE DRAWINGS

These and other objects, advantages and features of the invention will become apparatus from the following description thereof taken in conjunction with the accompanying drawings which illustrate a specific embodiment of the invention. In the drawings.

DESCRIPTION OF THE PREFERRED EMBODIMENT

A method of designing a post-objective type optical scanner capable of compensating for the curvature of field in the scanning and sub-scanning directions as well as the f·θ characters is explained hereunder.

In the first place, the construction of the post-objective type optical scanner is described, which is similar to that of the conventional one.

Figure 1:
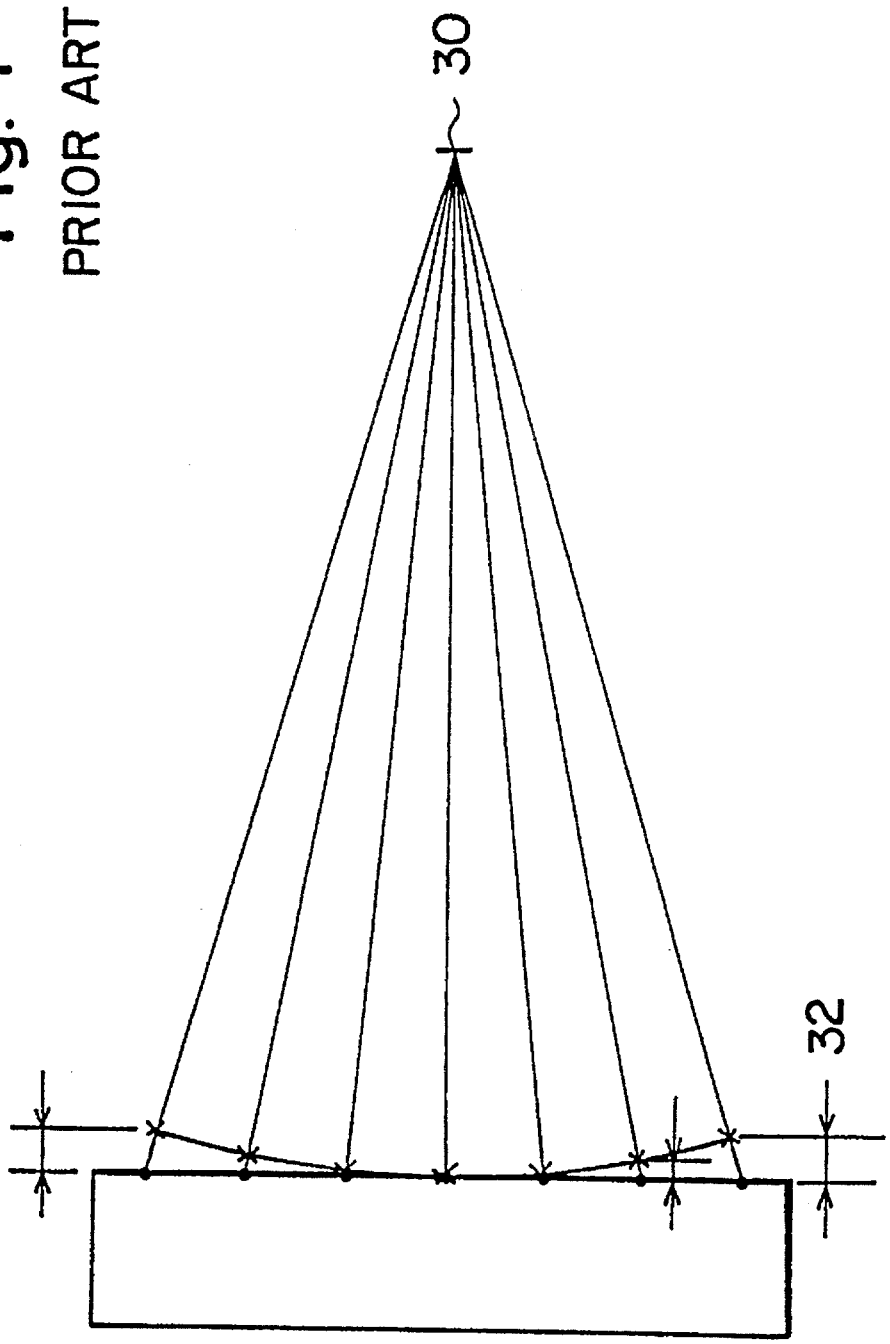
FIG. 1 is an illustration of the curvature of field in the scanning direction or in the sub-scanning direction.
Figure 2:
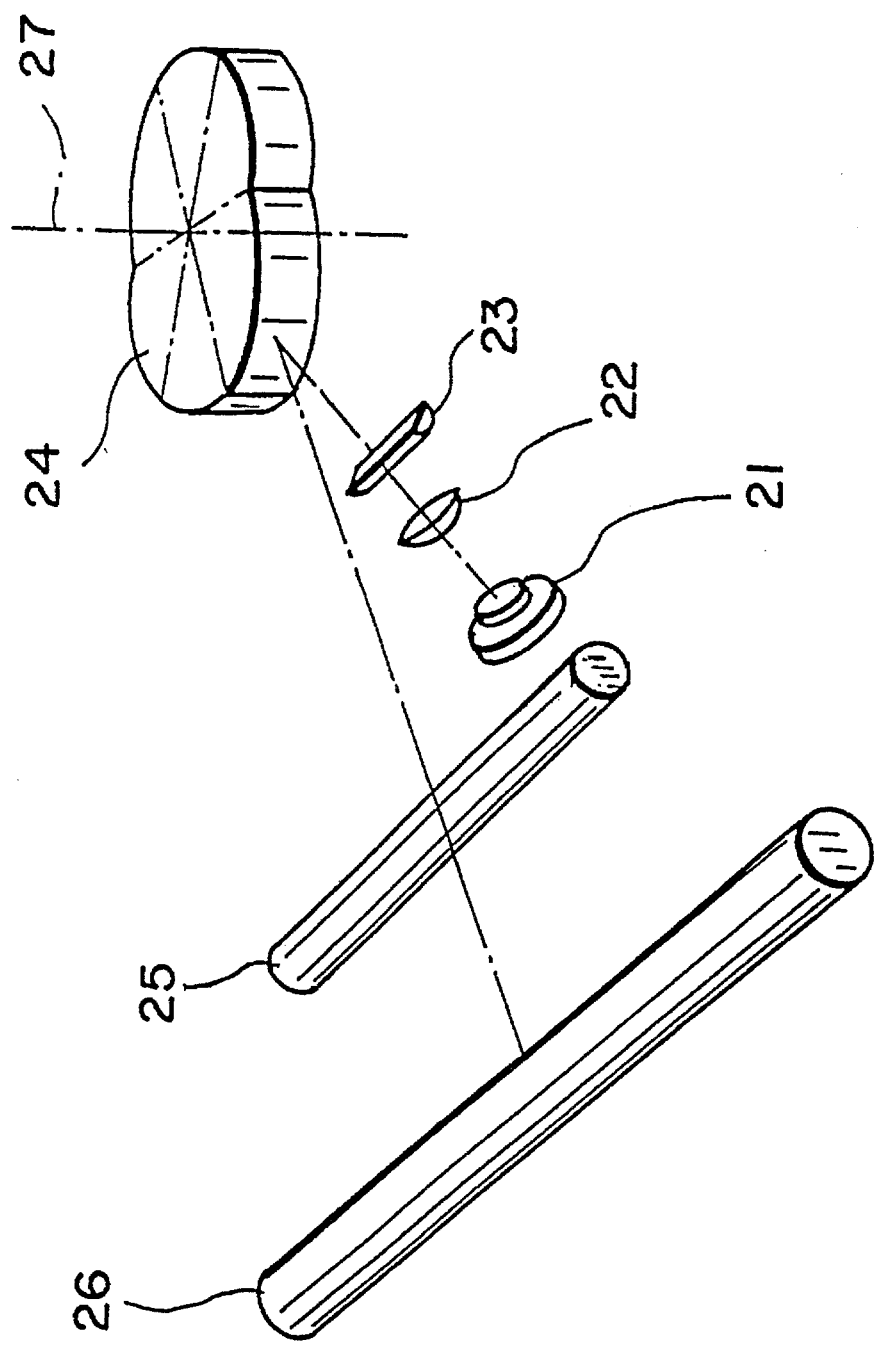
FIG. 2 is a schematic view of a conventional post-objective type optical scanner.
Figure 3A:
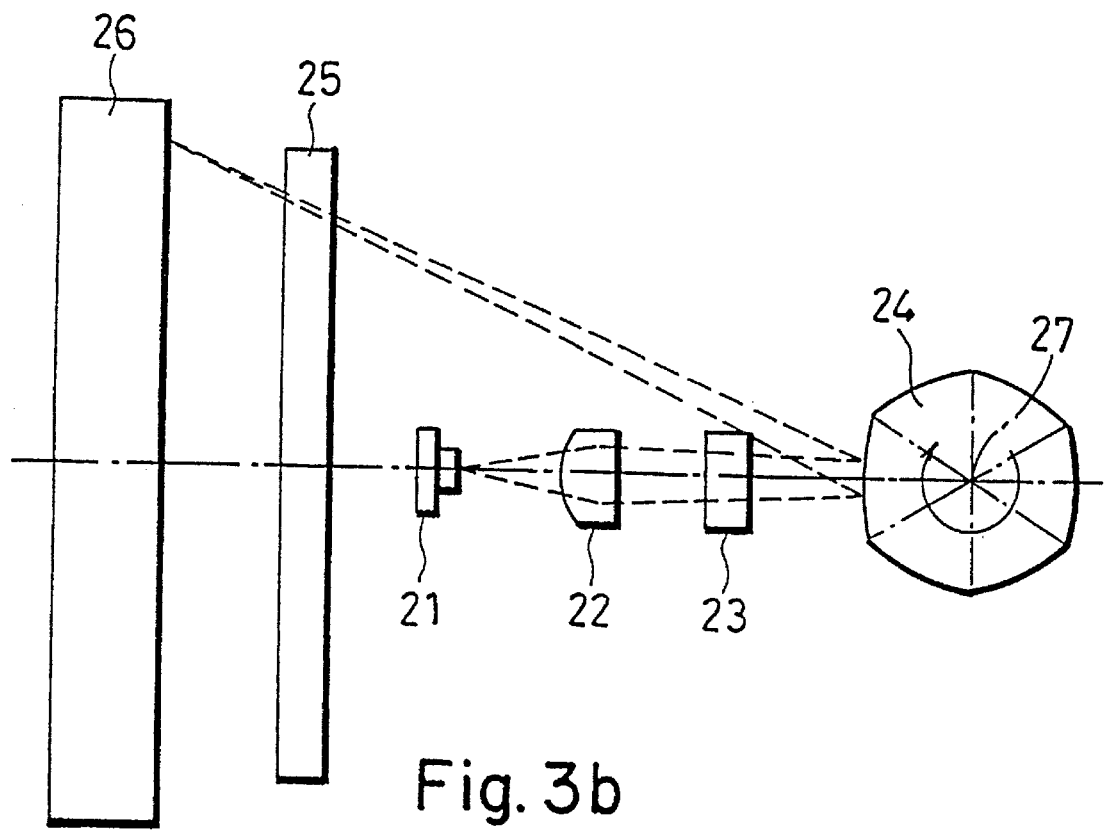
FIG. 3(a) is a top-view depicting the operation of the conventional post-objective type optical scanner.
Figure 3B:
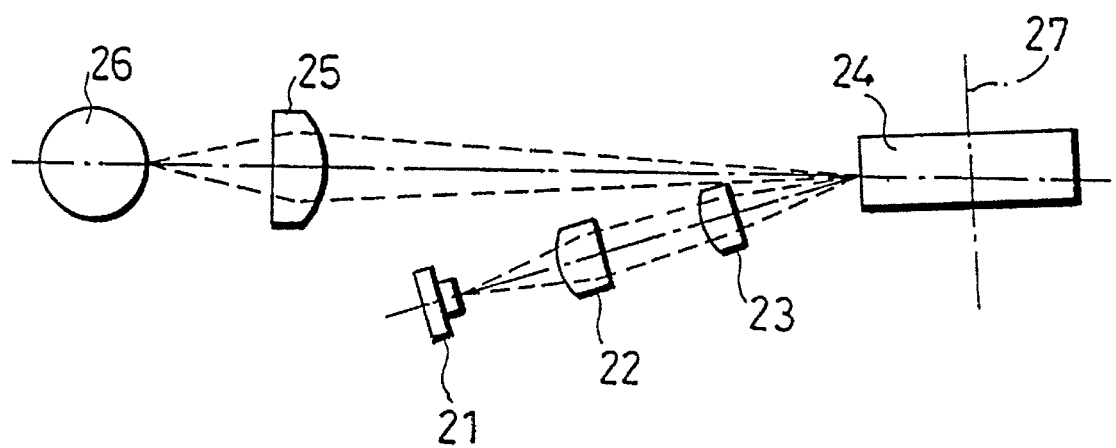
FIG. 3(b) is a side-view depicting the operation of the conventional post-objective type optical scanner.
Figure 4:
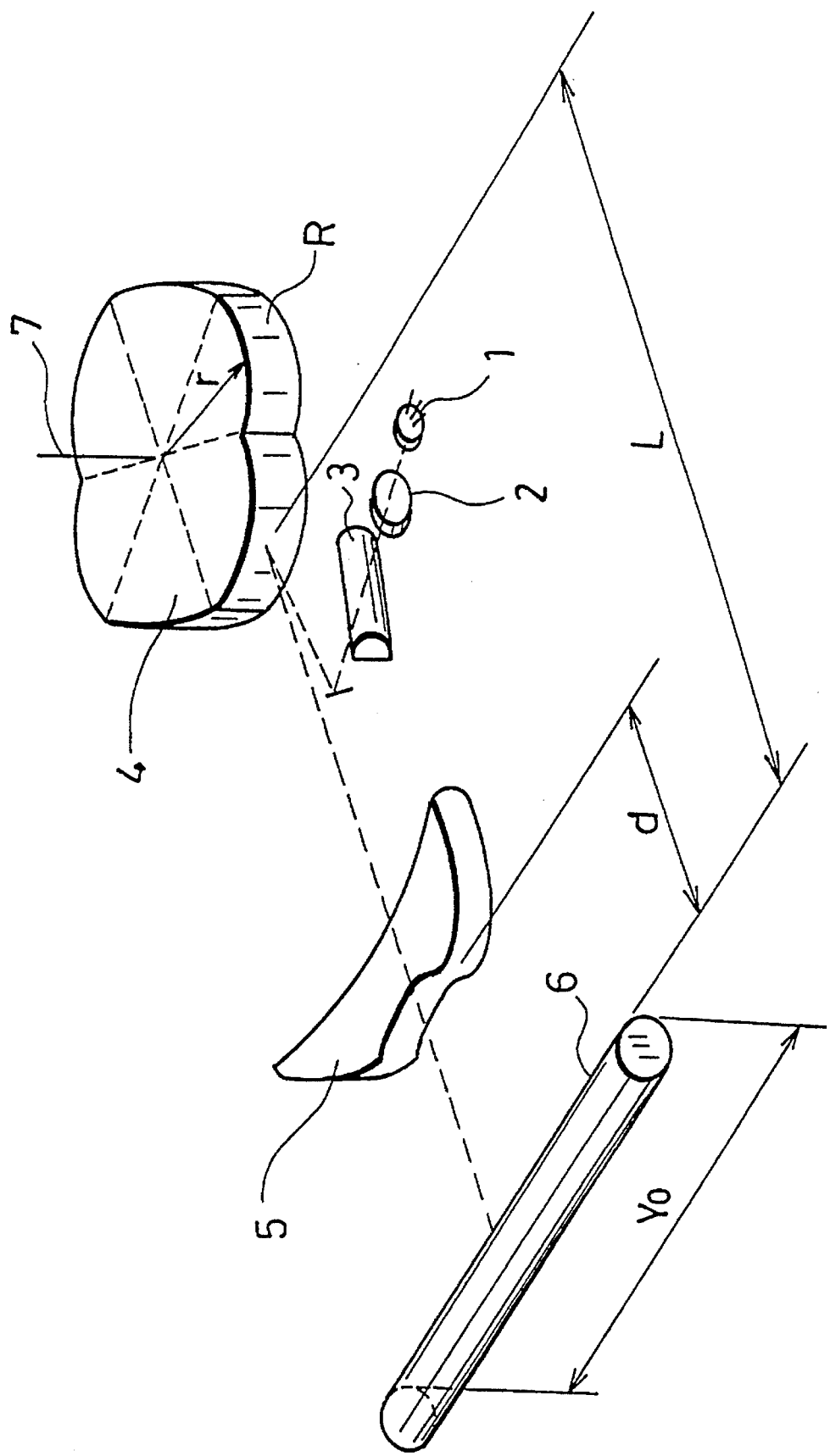
FIG. 4 is a schematic view of a post-objective type optical scanner made by the method of the present invention.

In FIG. 4, numeral 1 is a semiconductor laser, and numeral 2 is a condensing lens through which a beam of light from the semiconductor laser 1 is converged to a point on the scanning surface of a photosensitive drum 6 in the scanning direction. Numeral 3 is a cylindrical lens with a power in the sub-scanning direction, so that the incident light beam from the condensing lens 2 is converged to a point in the vicinity of a reflecting surface of a polygonal mirror 4 in the same direction. The polygonal mirror 4 is one of the optical deflectors, and is composed of cylindrical surfaces; an inradius, i.e. an outer length from an axis of the rotation 7 to the center of its cylindrical surface, is referred to as r, and a radius of curvature is referred to as R. It effects scanning of the light beam directed thereto on the photosensitive drum 6 by deflecting the light beam as it rotates around the axis of rotation 7. Numeral 5 is a compensating lens having a power in the sub-scanning direction, so that the incident light beam form the polygonal mirror 4 is converged to a point on the scanning surface of the photosensitive drum 6 in the same direction. The photosensitive drum 6 is a photosensitive body exposed when subjected to radiation of the light beam; the effective scanning width thereof is referred to as $Y_0$, a length from a point of deflection of the polygonal mirror 4 to the scanning surface to as L, a length from the surface of outgoing(the surface from which the light beam goes out) on the optical axis to the scanning surface to as d. Numeral 7 is the axis of rotation of the polygonal mirror 4.

Figure 5A:
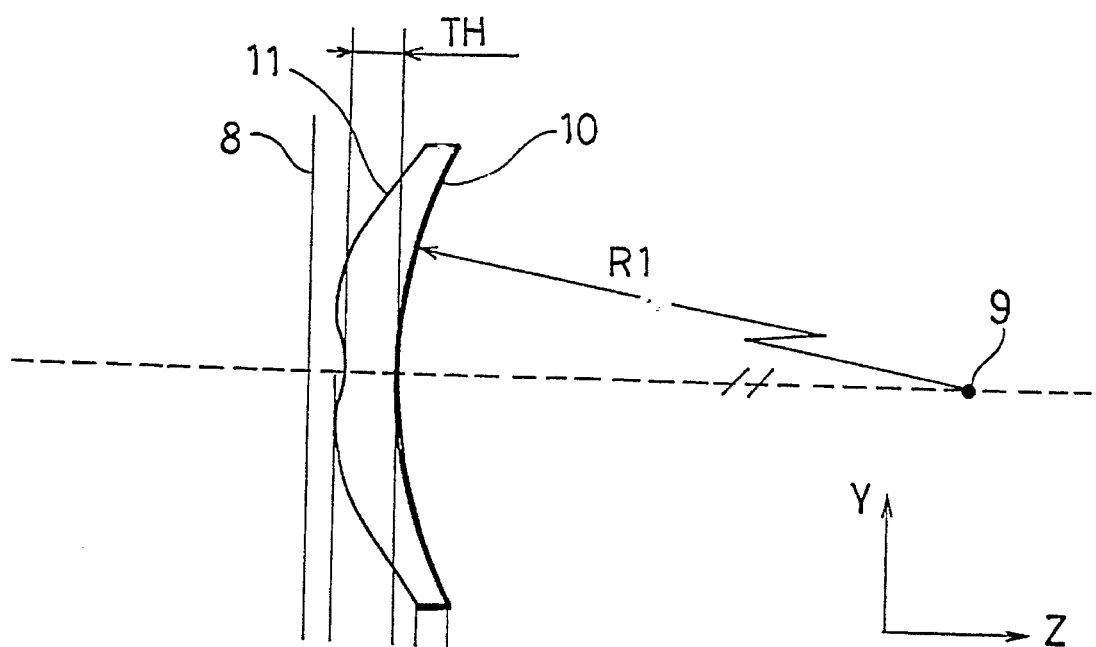
FIG. 5(a) is a top-view illustrating the detailed configuration of a compensating lens.
Figure 5B:
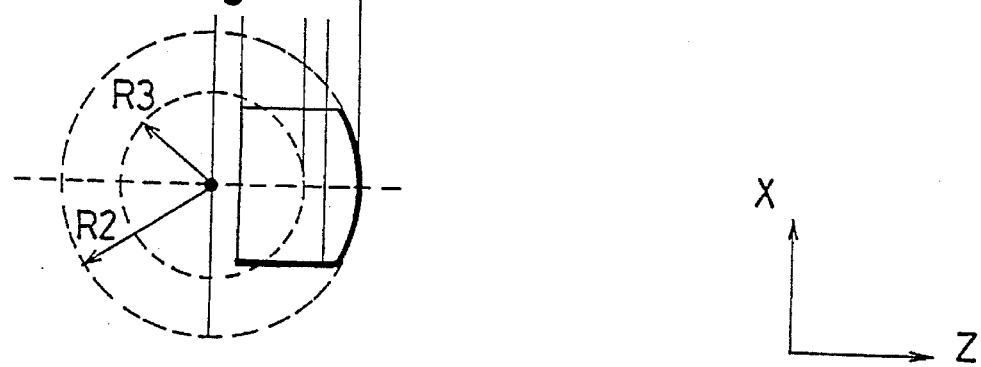
FIG. 5(b) is a side-view illustrating the detailed configuration of the compensating lens.

The detailed configuration of the compensating lens 5 is illustrated in FIG. 5(a) and (b); however, it should be noted that the configuration shown in FIG. 4–5(b) is exaggerated for explanation's convenience.

Numeral 8 is an axis of rotation which is parallel to the scanning direction and resides on a plane including the optical axis and parallel to the scanning direction, and numeral 9 is a point on the optical axis with a distance R1 to the compensating lens 5. Numeral 10 is a surface of incidence; it is a toric surface formed by scraping the compensating lens 5 rotating around the axis of rotation 8 off with an edge of a circle-shaped blade with a radius of R1 fixedly placed in a plane parallel to the scanning direction with a distance of R3 from the axis of rotation 8. Numeral 11 is the surface of outgoing; it can be expressed by Equation (1) below, assuming that the optical axis and surface of outgoing intersects at the origin in XYZ coordinates system.

$$Z = \frac{\frac{Y^2}{R2}}{1 + \sqrt{1 - (1+K)\left(\frac{Y}{R2}\right)^2}} + AY^4 + BY^6 + CY^8 + DY^{10} \quad (1)$$

R2 is a length from the axis of rotation 8 to the end of the toric surface 10, R3 is that to an intersection of the optical axis and the toric surface 10, and TH is a thickness of the compensating lens 5 at the center.

Figure 6A:
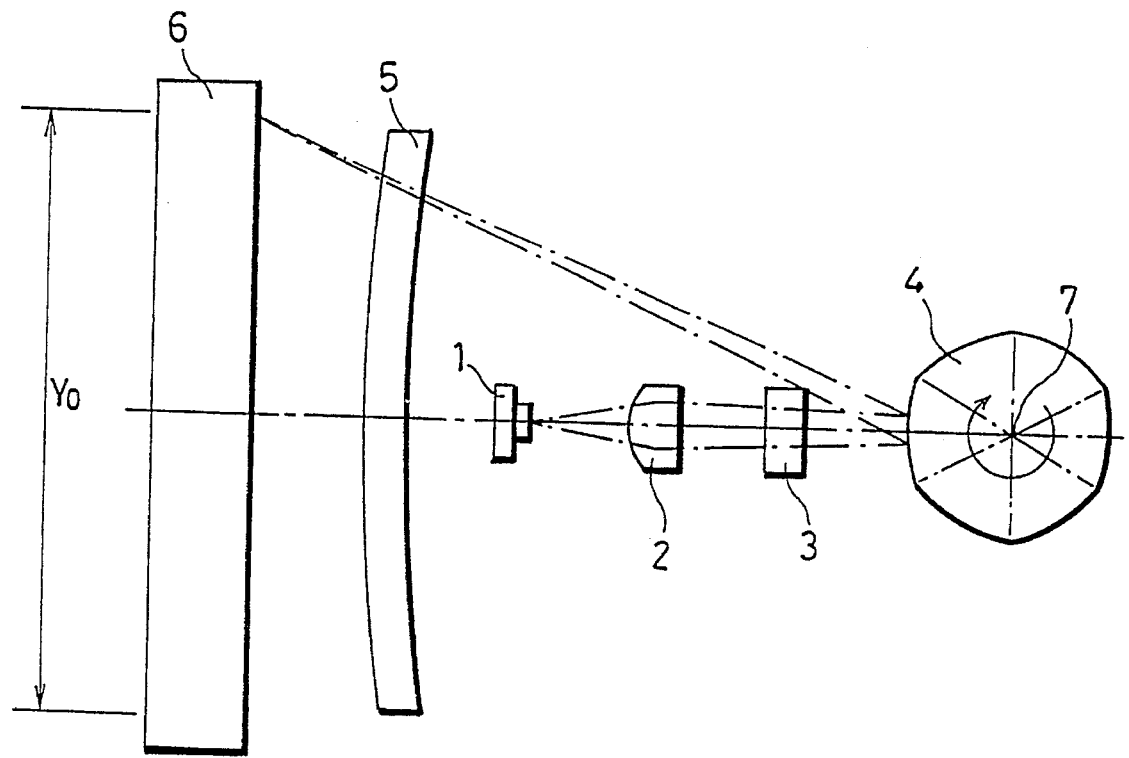
FIG. 6(a) is an optical path in the scanning direction.
Figure 6B:
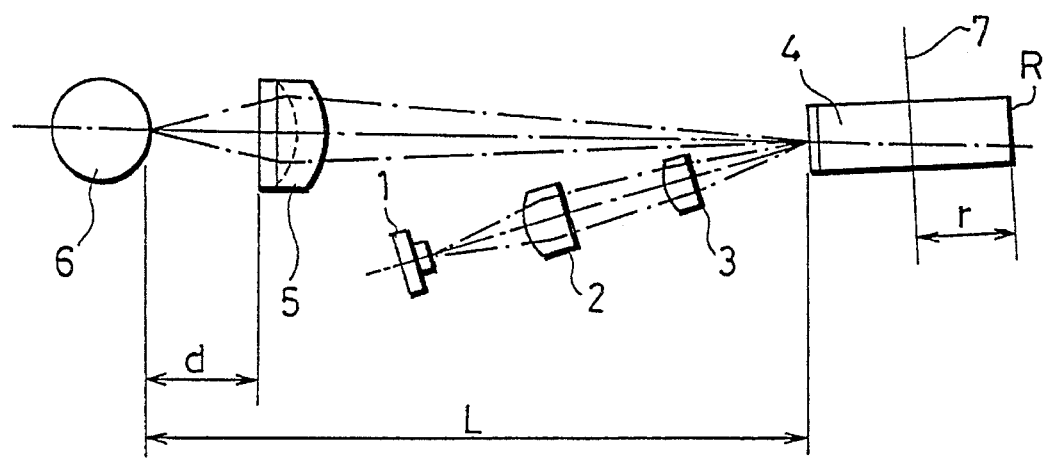
FIG. 6(b) is an optical path in the sub-scanning direction.

Next, the operation of the post-objective type optical scanner constructed as above is described while referring to FIGS. 6(a) and (b).

A beam of incident light from the semiconductor 1 is converged to a point on the photosensitive drum 6 in the scanning direction by the condensing lens 2, which is further converged to a point in the vicinity of the reflecting surface of the polygonal mirror 4 in the sub-scanning direction by the cylindrical lens 3. The light beam from the cylindrical lens 3 is in turn deflected by the polygonal mirror 4 which effects scanning thereof on the photosensitive drum 6 as it rotates around the axis of rotation 7. The compensating lens 5 is placed in such a way that the point of deflection is to be geometrically conjugate with the scanning surface of the photosensitive drum 6 in the sub-scanning direction so as to compensate for a tilt of the surface of the polygonal mirror 4. As well, the surface of incidence of the compensating lens 5 is designed to be the toric surface, so that a characteristic thereof can be exploited for the compensation for the curvature of field in the sub-scanning direction—the power in the sub-scanning direction varies with a length from the center thereof in the scanning direction. In addition, the compensation for the f·θ characteristic is made possible by designing the surface of outgoing to be a cylindrical surface expressed by an equation having terms of quartic or more order such as Equation (1).

Finally, the process of making the post-objective type optical scanner in accordance with the method of the present invention is described. The method of the present invention exploits a characteristic of the post-objective type optical scanner found in the course of computer simulation. Therefore, it is necessary to explain the characteristic to begin with.

The characteristic exploited in the method of the present invention is that the curvature of field in the scanning direction can be controlled by a scanning speed $Y_0/\theta_0$, i.e. a scanning width on the scanning surface per angle unit of rotation of the polygonal mirror 4: the curvature of field in the scanning direction drops to a minimum value at a specific scanning speed. Thus, it is envisaged that if the scanning speed is selected to be in a certain range including such a certain scanning speed, adequate compensation for the curvature of field in the scanning direction will be made possible.

The reason why the curvature of field varies in accordance with the scanning speed is because it is determined by a variety of parameters such as L, r, R, and the power of the compensating lens 5 in the scanning direction. The fact that these parameters can be any of countless figures makes it difficult indeed to analyze the correlation among these parameters theoretically. However, from some experiences, it has been inferred that R and r are dependent on L to some extent. Therefore, the inventors of the present invention placed a priority on an analysis of a correlation between L and scanning speed regardless of the size of the optical scanner itself.

Further computer simulation revealed that the compensation for the curvature of field in the scanning direction was inadequate when the correlation between L and $Y_0/\theta_0$ did not satisfy Equation (2) below, $$32 \cdot \frac{Y_0}{\theta_0} < L < 60 \cdot \frac{Y_0}{\theta_0} \quad (2)$$

which is modified to $$\frac{L}{60} < \frac{Y_0}{\theta_0} < \frac{L}{32} \quad (3)$$

Equation (3) leads to a conclusion that the compensation for the curvature of field in the scanning direction is inadequate when $Y_0/\theta_0$ is outside the range from L/60 to L/32 of L.

There is also a precondition for the method: the offset of the f·θ characteristic of the compensating lens 5 is maintained within ±0.5%, which is expressed as $$-0.5 \leq \frac{\theta \cdot \frac{Y_0}{\theta_0} - Y}{\theta \cdot \frac{Y_0}{\theta_0}} \cdot 100 \leq 0.5 \quad (4)$$

wherein Y is an image height in the scanning direction, i.e. a length from the intersection of the optical axis and scanning surface to a point of scanning, θ is an angle of rotation of the polygonal mirror (θ=0 corresponds to Y=0), Y0 is the effective scanning width in the scanning direction, θ0 is a maximum angle of rotation of the polygonal mirror corresponding to Y0.

The process of making the post-objective type optical scanner is as follows:

1) Assuming that $Y_0$, L, R, r are given constant numbers, the compensating lens 5 such that maintains a stable scanning speed while satisfying Equation (3) is designed (R2, R3, TH, K, A, B, C, D are determined); $Y_0$, L, R, r, and d were explained with referring to FIG. 4, and R1, R2, R3, and TH to FIGS. 5(a) and (b), and K, A, B, C, and D are the coefficients of aspherical surface of the compensating lens 5 expressed by Equation (1). As a result, several compensating lenses 5 with different specifications are designed.

2) From the scanning speeds of these compensating lenses, one scanning speed that is approximate to the specific scanning speed at which the curvature of field in the scanning direction drops to a minimum value is selected, or the specification of the compensating lens 5 may be corrected based on the specific speed.

Examples of the specifications of the compensating lens determined by the computer simulation are set forth in Tables 1–4.

TABLE 1

| $Y_0$ | L | R | r | d |
|---|---|---|---|---|
| 260 | 230 | 130 | 25 | 33 |
| R 1 | R 2 | R 3 | TH | |
| 679.71 | 168.73 | 21.04 | 40 | |
| K | A | B | C | D |
| 0.0 | 6.264E-8 | -2.495E-12 | 1.362E-16 | -1.522E-21 |

TABLE 2

| $Y_0$ | L | R | r | d |
|---|---|---|---|---|
| 260 | 230 | 145 | 25 | 46 |
| R 1 | R 2 | R 3 | TH | |
| 708.53 | 257.79 | 22.10 | 27 | |
| K | A | B | C | D |
| 0.0 | 1.004E-7 | -2.111E-12 | 1.137E-16 | -8.358E-22 |

TABLE 3

| $Y_0$ | L | R | r | d |
|---|---|---|---|---|
| 260 | 230 | 160 | 25 | 58 |
| R 1 | R 2 | R 3 | TH | |
| 730.02 | 598.76 | 23.04 | 15 | |
| K | A | B | C | D |
| 0.0 | 1.186E-8 | -3.249E-12 | 1.764E-16 | -2.960E-20 |

TABLE 4

| $Y_0$ | L | R | r | d |
|---|---|---|---|---|
| 220 | 185 | 142 | 24 | 52.9 |
| R 1 | R 2 | R 3 | TH | |
| 495.00 | 508.20 | 19.95 | 17.5 | |
| 0.0 | 2.418E-7 | -7.259E-12 | 6.462E-17 | -3.539E-20 |

The specific scanning speed ($Y_0/\theta_0$), and a ratio of the L to $Y_0/\theta_0$ ($L/(Y_0/\theta_0)$), and the maximum curvature of field in the scanning direction ($\Delta s\_max$) of the compensating lens 5 of Table 1 to 4 were evaluated and the result are shown in Table 5

TABLE 5

| | $Y_0/\theta_0$ | $L/(Y_0/\theta_0)$ | $\Delta S\_max$ |
|---|---|---|---|
| Table1 | 5.8 | 39.65 | 1.69 |
| Table 2 | 6.14 | 38.30 | 0.51 |
| Table 3 | 6.6 | 34.85 | 0.92 |
| Table 4 | 5.1 | 36.27 | 1.25 |

It is apparent from Table 5 that $\Delta S\_max$ was far less than that of the conventional post-objective type optical scanner—2.7 mm.

Figure 7:
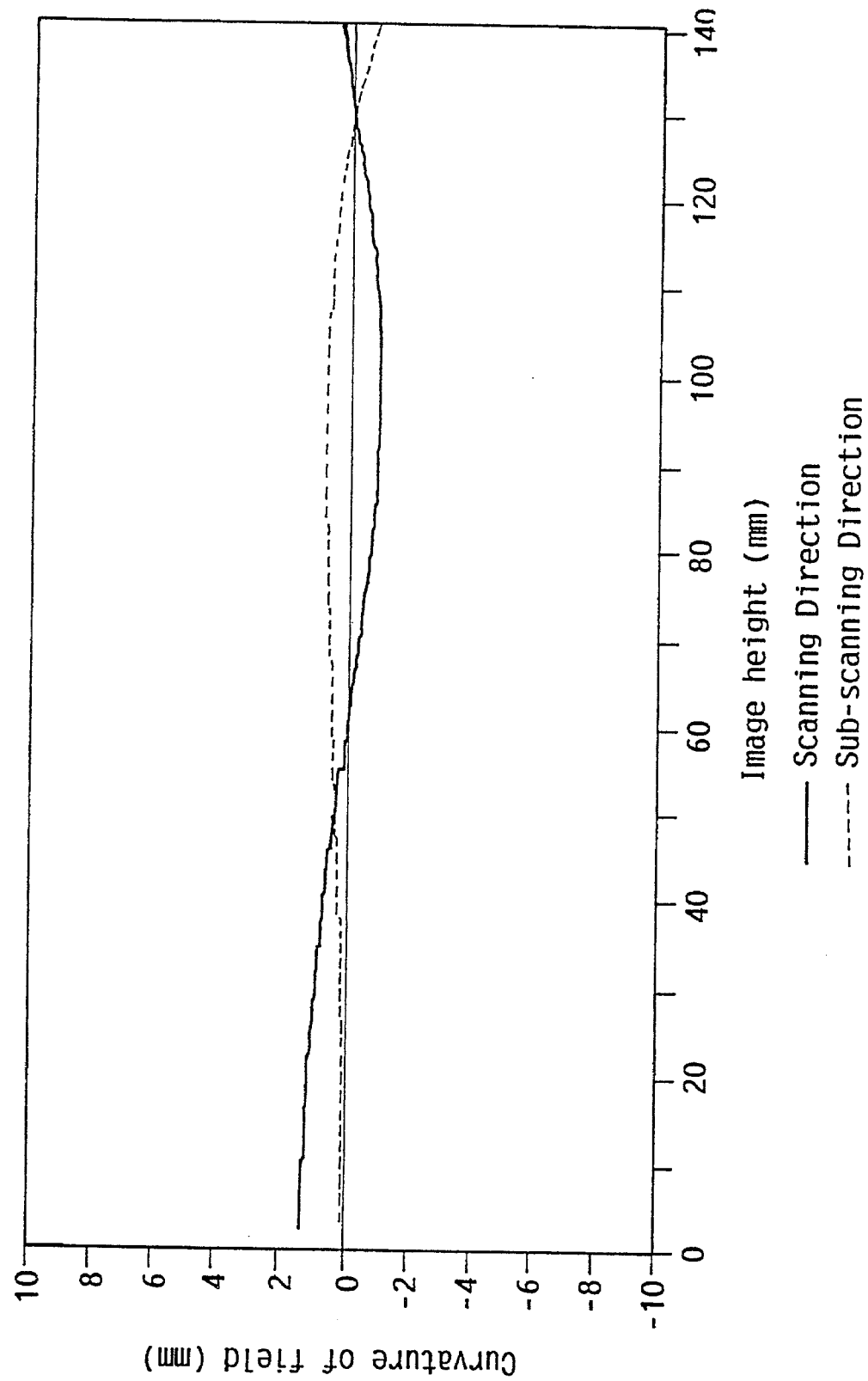
FIG. 7 is a graph of the evaluation of the curvature of filed in the scanning and sub-scanning directions.
Figure 8:
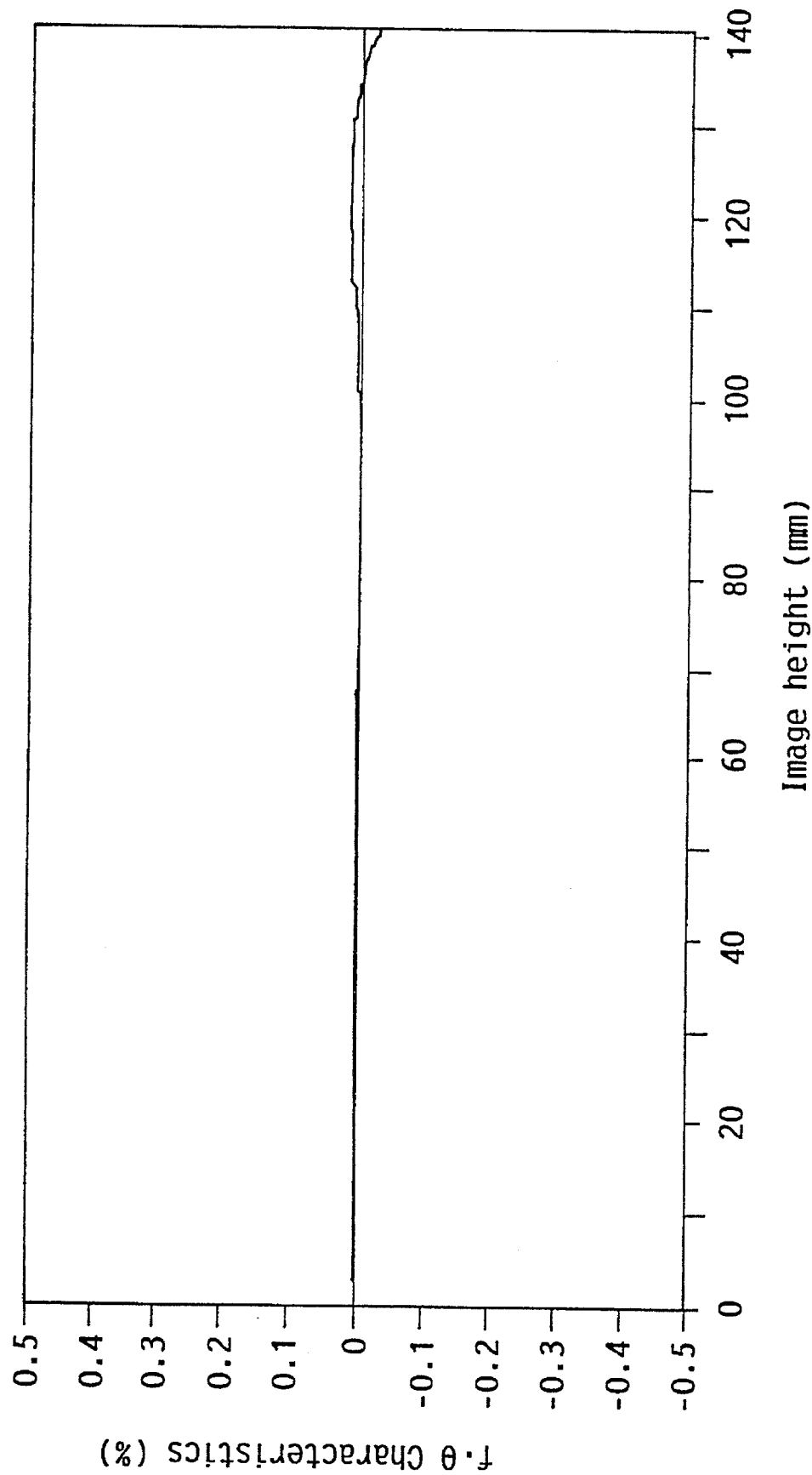
FIG. 8 is a graph of the evaluation of the f·θ characteristic.

In addition, the curvature of field in the both scanning directions and f·θ characteristic were evaluated using the compensating lens 5 of Table 2, and the results are shown by graphs in FIGS. 7 and 8, respectively. As can be seen therefrom, the compensation for the curvature of field in the sub-scanning direction was adequate for high resolution, while the setoff of the f·θ characteristic is maintained within ±0.5%, the range expressed by Equation (2).

Figure 9:
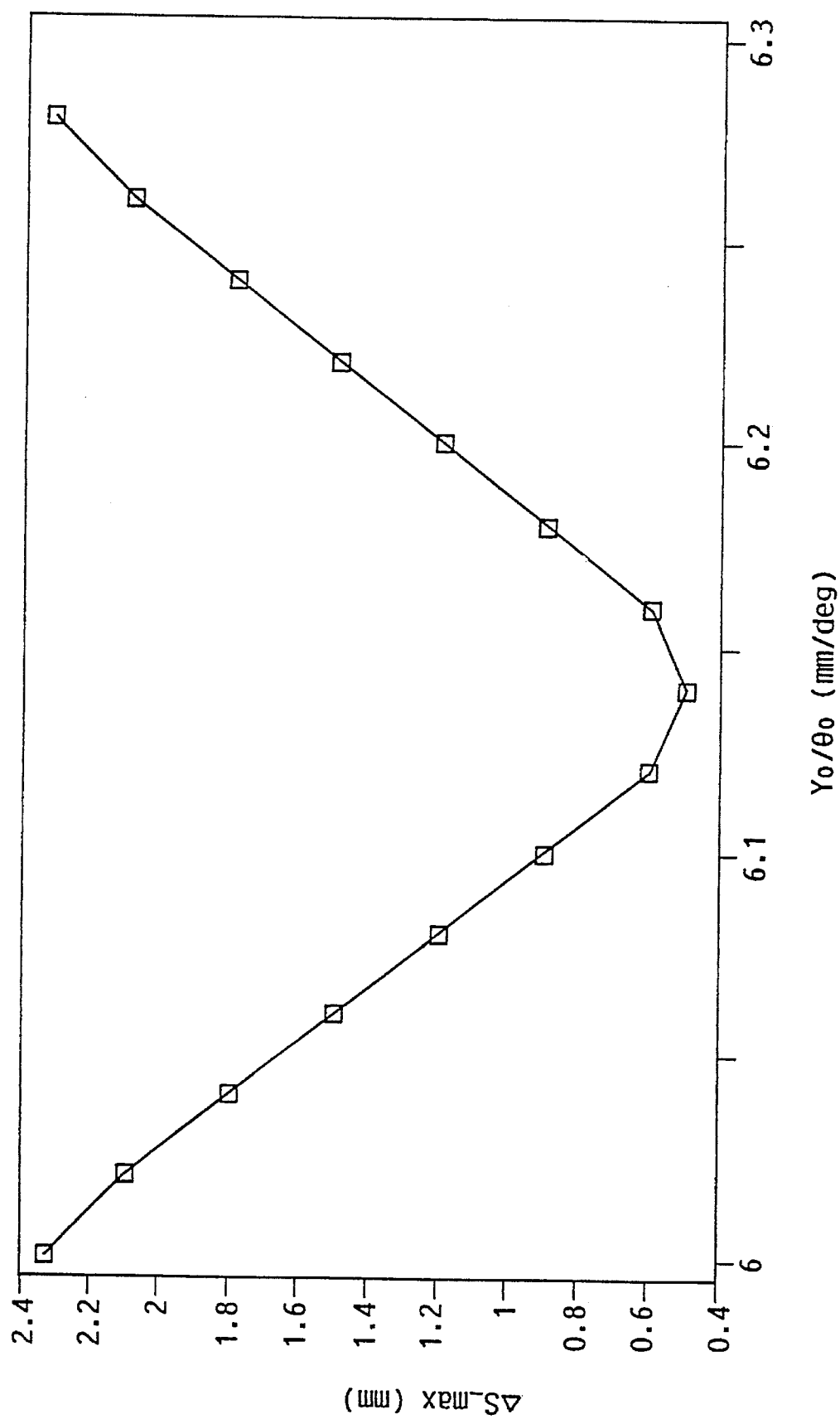
FIG. 9 is a graph showing a correlation between a scanning speed and the curvature of field in the scanning direction.

Furthermore, a correlation between the curvature of field in the scanning direction and scanning speed with the compensating lens of Table 2 is shown in FIG. 9 from which one can see the characteristic exploited in the method of the present invention.

In the method of designing the post-objective type optical scanner of the present invention, Equation (2) or (3) is used, which simplifies the process of making the post-objective type optical scanner capable of compensating for the curvature of field in the scanning direction adequately to realize high resolution if the other parameters concerned for the curvature of field are not taken into consideration.

It is well envisaged that if the other parameters concerned for the curvature of field are analyzed, the compensation for the curvature of field in the scanning direction will be further improved. However, in effect, if only Equation (2) or (3) is satisfied, the post-objective type optical scanner realizes the highest resolution to date. Besides, such analysis is accompanied with laborious and complicated procedures, which only results in the increase of manufacturing cost.

In the preferred embodiment, the reflecting surface of the polygonal mirror 4 is designed to be cylindrical; however, it may be designed to be spherical, which is processed easier. The surface of outgoing does not have a curvature in the sub-scanning direction in the preferred embodiment, but it may be a toric surface.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A post-objective type optical scanner for directing a converged light beam upon a scanning surface, the scanner comprising:

a rotating optical deflector including a plurality of convex reflecting surfaces upon which the converged light beam is directed at a point of deflection on the plurality of reflecting surfaces for reflecting the converged light beam along an optical path between the point of deflection and the scanning surface as the optical deflector rotates at a specified scanning speed selected depending upon a correlative relationship between a scanning speed, defined as a scanning width on the scanning surface per an angle unit of rotation of the rotating optical deflector, and a curvature of field in a scanning direction associated with the scanning surface, wherein the specified scanning speed is larger than 1/60 radians of a length of the optical path and smaller than 1/32 radians of the length of the optical path; and a compensating lens positioned along the optical path, the compensating lens including an incident surface facing the rotating optical deflector and an outgoing surface facing the scanning surface, the incident surface having a toric shape exploiting the correlative relationship to compensate for the curvature of field in the scanning direction and for a curvature of field in a sub-scanning direction associated with the scanning surface, the outgoing surface having an aspheric shape to compensate for an f·Θ characteristic which is a measure of proportionality between the scanning width and an angle of scanning of the rotating optical deflector.

2. The post-objective type optical scanner of claim 1, wherein the f·θ characteristic is maintained within a range from −0.5% to 0.5%.

3. The post-objective type optical scanner of claim 1, wherein the outgoing surface is expressed by an equation having terms of quartric or more order.

4. The post-objective type optical scanner of claim 3, wherein the equation having terms of quartric or more order is expressed as:

$$Z = \frac{\frac{Y^2}{R2}}{1 + \sqrt{1 - (1+K)\left(\frac{Y}{R2}\right)^2}} + AY^4 + BY^6 + CY^8 + DY^{10}$$

wherein R2, K, A, B, C, and D are constants, and X, Y, and Z respectively refer to a coordinate system including X, Y, and Z axes with an origin located at a center of the outgoing surface, the Z axis residing on an optical axis from the origin to the point of deflection, the Y axis being parallel to the scanning direction.

5. The post-objective type optical scanner of claim 1, wherein the f·θ characteristic of the compensating lens is maintained within the following range:

$$-0.5 \leq \frac{\theta \cdot \frac{Y_0}{\theta_0} - Y}{\theta \cdot \frac{Y_0}{\theta_0}} \cdot 100 \leq 0.5$$

wherein Y is an image height in the scanning direction from an optical axis, Θ is an angle of rotation of the optical deflector, $Y_0$ is the maximum scanning width in the scanning direction from the optical axis, and $\Theta_0$ is a maximum angle of rotation of the optical deflector corresponding to $Y_0$.

6. A post-objective type optical scanner for directing a converged light beam upon a scanning surface, the scanner comprising:

a rotating optical deflector including a plurality of convex reflecting surfaces upon which the converged light beam is directed at a point of deflection on the plurality of reflecting surfaces for reflecting the converged light beam along an optical path between the point of deflection and the scanning surface as the optical deflector rotates at a specified scanning speed selected depending upon a correlative relationship between a scanning speed, defined as a scanning width on the scanning surface per an angle unit of rotation of the rotating optical deflector, and a curvature of field in a scanning direction associated with the scanning surface; and means for compensating the light beam reflected from the convex reflecting surfaces consisting of a compensating lens positioned along the optical path, the compensating lens including an incident surface facing the rotating optical deflector and an outgoing surface facing the scanning surface, the incident surface having a toric shape exploiting the correlative relationship to compensate for the curvature of field in the scanning direction and for a curvature of field in a sub-scanning direction associated with the scanning surface, the outgoing surface having an aspheric shape to compensate for an f·Θ characteristic which is a measure of proportionality between the scanning width and an angle of scanning of the rotating optical deflector wherein the outgoing surface is expressed by an equation having terms of quartic or more as follows:

$$Z = \frac{\frac{Y^2}{R2}}{1 + \sqrt{1 - (1+K)\left(\frac{Y}{R2}\right)^2}} + AY^4 + BY^6 + CY^8 + DY^{10}$$

wherein R2, K, A, B, C, and D are constants, and X, Y, and Z respectively refer to a coordinate system including X, Y, and Z axes with an origin located at a center of the outgoing surface, the Z axis residing on an optical axis from the origin to the point of deflection, the Y axis being parallel to the scanning direction.

7. The post-objective type optical scanner of claim 6, wherein the f·Θ characteristic is maintained within a range from −0.5% to 0.5%.

8. The post-objective type optical scanner of claim 7, wherein the specified scanning speed is larger than 1/60 radians of a length of the optical path and smaller than 1/32 radians of the length of the optical path.

* * * * *